(12) United States Patent
Kim et al.

(10) Patent No.: US 10,007,411 B2
(45) Date of Patent: Jun. 26, 2018

(54) ELECTRONIC DEVICE AND DISPLAY METHOD THEREOF

(71) Applicant: Samsung Electronics Co., Ltd., Suwon-si, Gyeonggi-do (KR)

(72) Inventors: Che Young Kim, Seoul (KR); Yu Sic Kim, Suwon-si (KR); Chae Kyung Lee, Seoul (KR); Dok Shin Lim, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 386 days.

(21) Appl. No.: 14/555,918

(22) Filed: Nov. 28, 2014

(65) Prior Publication Data
US 2015/0199120 A1    Jul. 16, 2015

(30) Foreign Application Priority Data

Jan. 10, 2014 (KR) .................. 10-2014-0003142

(51) Int. Cl.
| | | |
|---|---|---|
| *G06F 3/048* | (2013.01) | |
| *G06F 3/0484* | (2013.01) | |
| *G06T 11/60* | (2006.01) | |
| *G06F 3/0481* | (2013.01) | |

(52) U.S. Cl.
CPC ........ *G06F 3/04845* (2013.01); *G06F 3/0481* (2013.01); *G06F 3/04842* (2013.01); *G06F 3/04847* (2013.01); *G06T 11/60* (2013.01)

(58) Field of Classification Search
CPC ...................................................... G06F 3/048
See application file for complete search history.

(56) References Cited

U.S. PATENT DOCUMENTS

| | | | |
|---|---|---|---|
| 8,543,622 B2 | 9/2013 | Giblin | |
| 2009/0315869 A1 | 12/2009 | Sugihara et al. | |
| 2010/0042926 A1* | 2/2010 | Bull .................. | G06F 17/30047 715/732 |
| 2011/0177914 A1* | 7/2011 | Park .................... | A63B 24/0062 482/1 |
| 2011/0234626 A1* | 9/2011 | Seong ................ | H04N 1/00167 345/619 |
| 2012/0239661 A1 | 9/2012 | Giblin | |
| 2014/0059053 A1 | 2/2014 | Giblin | |

FOREIGN PATENT DOCUMENTS

EP          2369829 A2     9/2011

* cited by examiner

*Primary Examiner* — Peiyong Weng
(74) *Attorney, Agent, or Firm* — Jefferson IP Law, LLP

(57) ABSTRACT

An electronic device is provided The electronic device includes an input unit configured to receive a selection on an object theme including at least one object from a user, an information collection unit configured to collect information corresponding to the object theme, a storage unit configured to divide the collected information into variable information or invariable information and store the information, and a display unit, when new variable information is collected according to a user instruction for reselecting the object theme, configured to add an object to an image by using the stored information and the new variable information and display the image.

20 Claims, 16 Drawing Sheets

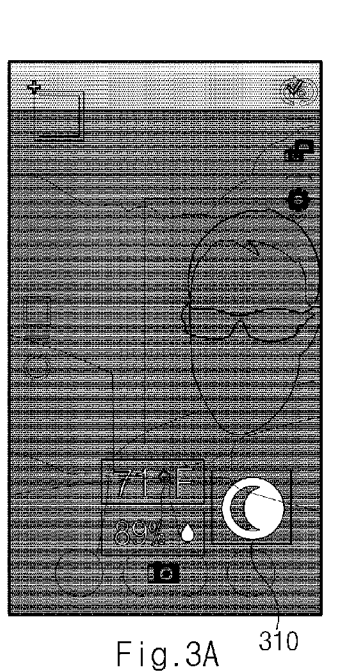
Fig.3A  310
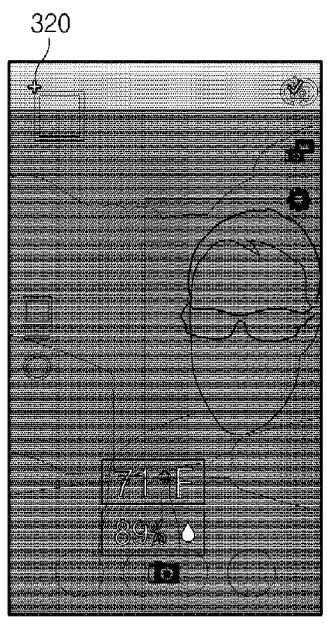
Fig.3B
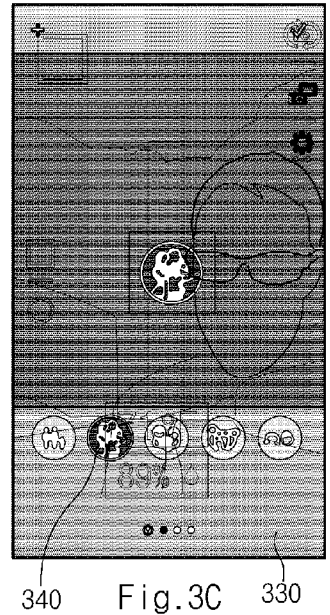
340  Fig.3C  330
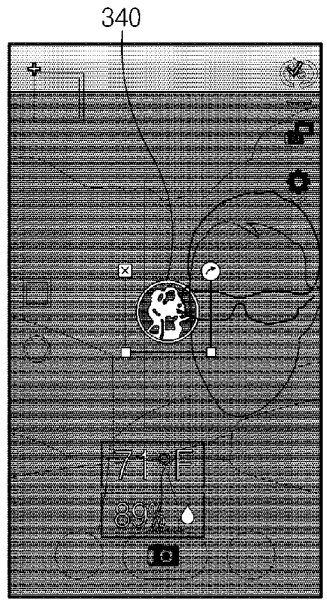
Fig.3D
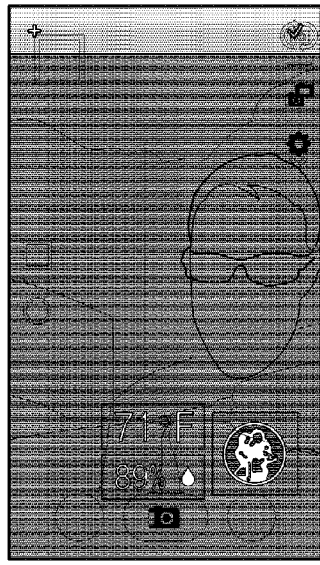
Fig.3E

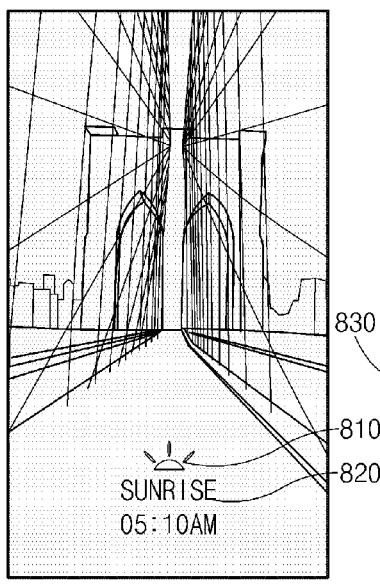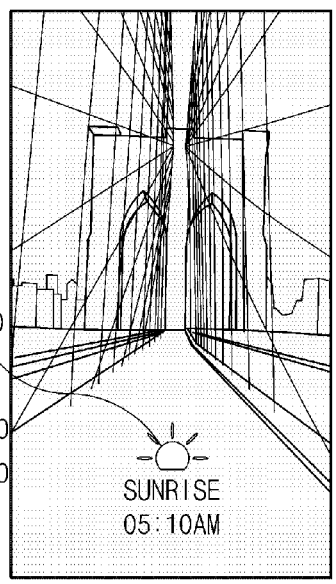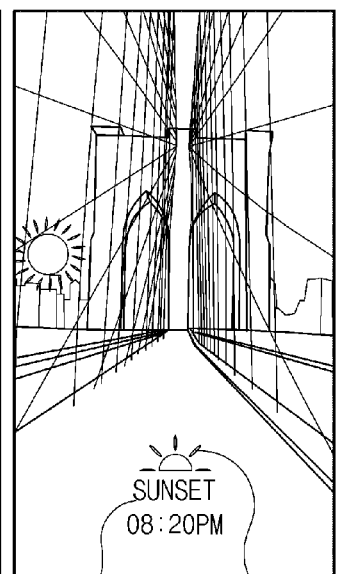

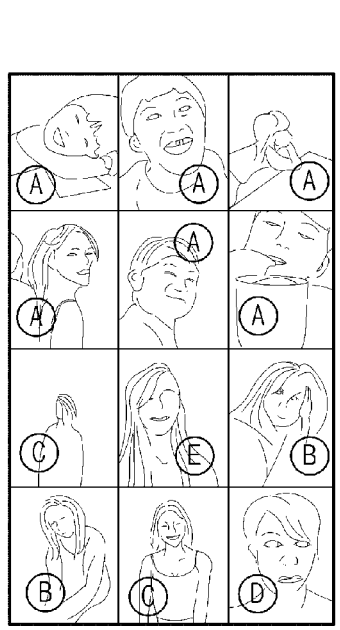 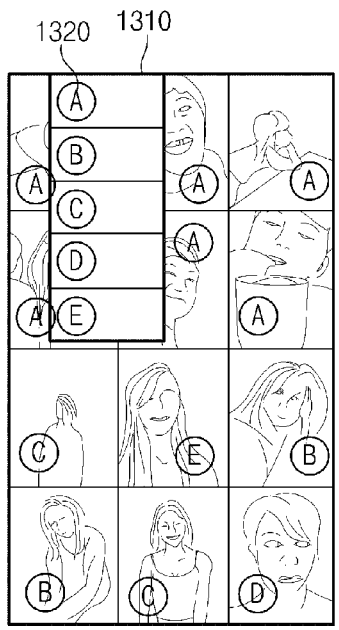 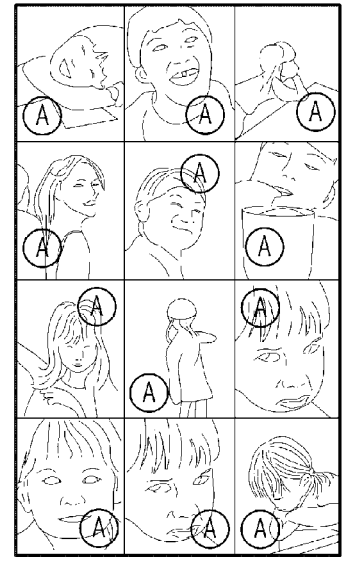
Fig.13A  Fig.13B  Fig.13C
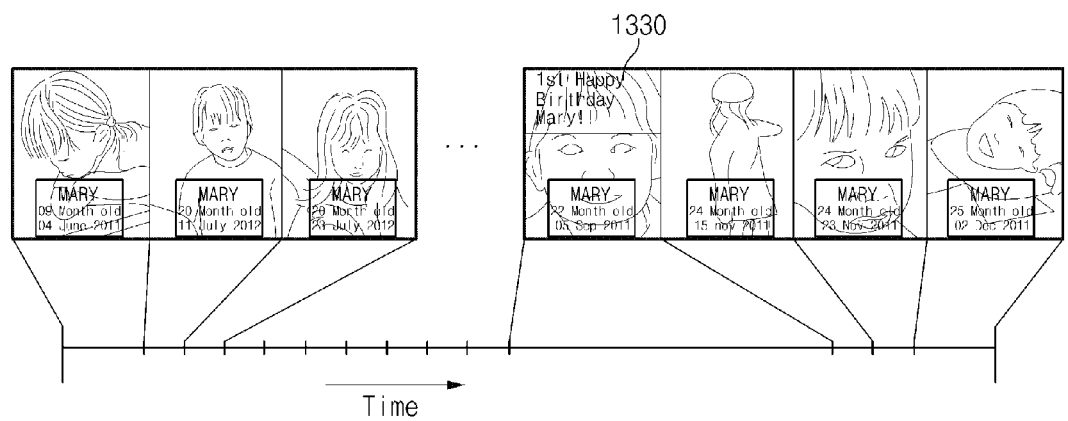
Fig.13D

ELECTRONIC DEVICE AND DISPLAY METHOD THEREOF

CROSS-REFERENCE TO RELATED APPLICATION(S)

This application claims the benefit under 35 U.S.C. § 119(a) of a Korean patent application filed on Jan. 10, 2014 in the Korean Intellectual Property Office and assigned Serial number 10-2014-0003142, the entire disclosure of which is hereby incorporated by reference.

TECHNICAL FIELD

The present disclosure relates to an electronic device that may add an object to an image and a display method thereof. More particularly, the present disclosure relates to an electronic device capable of providing various forms of objects that reflect a user's surroundings and personality when adding related information to an image, and a display method thereof.

BACKGROUND

People take pictures to share their memories, such as those of travels and anniversaries. Recently, since portable terminal devices, such as smartphones and tablet Personal Computers (PCs), are equipped with cameras, taking pictures in everyday life has become common. Additionally, images that users capture are being more frequently shared through Social Network Service (SNS).

In the case of old-fashioned cameras that use film, it is not possible to edit an image that has already been captured, but with the advent of a digital camera, it is possible to freely delete and edit captured images.

Accordingly, applications that reflect a user's personality by adding related information or icons to captured images are provided.

As mentioned above, although taking pictures has become ubiquitous and various applications for adding information thereto are provided, such techniques merely synthesize information or icons provided in advance from capturing applications. Therefore, the surroundings and personality of a user may not be fully reflected.

Therefore, a need exists for an electronic device capable of providing various forms of objects that reflect a user's surroundings and personality when adding related information to an image, and a display method thereof.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device capable of providing various forms of objects that reflect a user's surroundings and personality when adding related information to an image, and a display method thereof.

Another aspect of the present disclosure is to provide an electronic device that manages an object to which an image is applied and regenerating it as another form of content, and a display method thereof.

In accordance with an aspect of the present disclosure, an electronic device is provided. The electronic device includes an input unit configured to receive a selection on an object theme including at least one object from a user, an information collection unit configured to collect information corresponding to the object theme, a storage unit configured to divide the collected information into variable information or invariable information and store the information, and a display unit, when new variable information is collected according to a user instruction for reselecting the object theme, configured to add an object to an image by using the stored information and the new variable information and display the image.

The display unit may add an object based on the stored variable information and the new variable information to the image.

The display unit may change at least one of a type, size and position of the object added to the image according to the variable information.

When new variable information is collected according to a user instruction for reselecting the object theme, the storage unit may link stored information and the new variable information and may store the linked information.

The information collection unit may generate new information by using the collected information.

The display unit may add a new object to the image having the object added thereto according to a user instruction.

The display unit may change at least one of a position and size of the object added to the image according to a user instruction.

The display unit may delete the object added to the image according to a user instruction.

When a slide show instruction for an image having the same object theme applied thereto is inputted, the display unit may align images based on one of the variable information and may sequentially display the aligned images.

The display unit may change a position of the object added to the image to correspond to an order of a currently displayed image among the aligned images and display the image.

In accordance with another aspect of the present disclosure, a display method is provided. The display method includes receiving a selection on an object theme including at least one object from a user, collecting information corresponding to the object theme, dividing the collected information into variable information or invariable information and storing the information, when the object theme is reselected by a user, collecting new variable information, adding an object to an image by using the stored information and the new variable information, and displaying the image having the object added thereto.

The-adding-of-the-object-to-the-image may include adding an object based on the stored variable information and the new variable information to the image.

The-collecting-of-the-information may include collecting information through a web server or a terminal device or collecting information inputted from a user, and generating new information by using the collected information.

The method may further include receiving a user instruction for adding a new object to the image having the object added thereto, collecting information corresponding to the new object, and adding the new object to the image by using the collected information and displaying the image.

The method may further include receiving a user instruction for editing the object added to the image, and changing at least one of a position and size of the object added to the image according to the user instruction and displaying the image.

The method may further include receiving a user instruction for deleting the object added to the image, and deleting the object added to the image according to the user instruction and displaying the image.

The method may further include receiving a selection on at least one object from a user, generating an object theme including the selected object, and storing the object theme.

The method may further include receiving a slide show instruction for an image having the same object theme applied thereto, aligning images image having the same object theme applied thereto based on one of the variable information, and sequentially displaying the aligned images.

The-sequentially-displaying-of-the-aligned-images may include changing a position of the object added to the image to correspond to an order of a currently displayed image among the aligned images and displaying the image.

In accordance with another aspect of the present disclosure, a non-transitory computer-readable recording medium having a program recorded thereon and implementing the method is provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3A, 3B, 3C, 3D, and 3E are views illustrating a process for editing an object added to an image according to an embodiment of the present disclosure.

FIGS. 6A, 6B, 6C, 6D, 6E, 7A, 7B, 7C, 7D, 7E, 7F, 8A, 8B, 8C, 9, 10, 11, and 12 are views illustrating a process for adding an object to an image according to an embodiment of the present disclosure.

FIGS. 13A, 13B, 13C, and 13D are views illustrating a process for displaying an image having an object added thereto according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Figure 1:
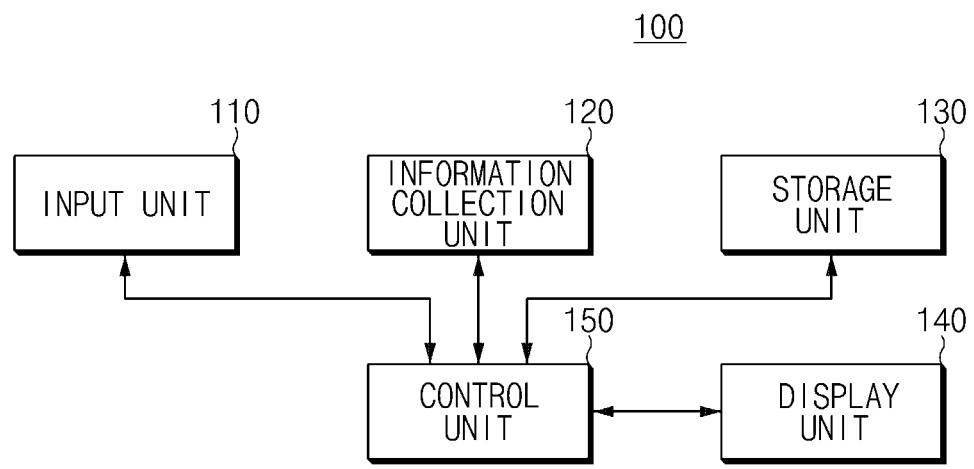
FIG. 1 is a block diagram illustrating a configuration of an electronic device according to an embodiment of the present disclosure.

FIG. 1 is a block diagram illustrating a configuration of an electronic device according to an embodiment of the present disclosure.

Referring to FIG. 1, an electronic device 100 includes an input unit 110, an information collection unit 120, a storage unit 130, a display unit 140, and a control unit 150. The electronic device 100 may be implemented with various kinds of electronic devices including a display screen, for example, TVs, mobile phones, smartphones, Personal Digital Assistants (PDAs), notebook Personal Computers (PCs), desktop PCs, Tablet PCs, and the like.

The input unit 110 may receive a user instruction. For example, the input unit 110 may receive a user instruction selecting object theme including at least one object. Thereafter, the input unit 110 may receive a user instruction for adding a new object to an object-added image or changing or deleting at least one of the position and size of an added object.

The electronic device 100 may provide an object theme including a certain object. Thereafter, a user may generate a new object theme by editing a provided object theme or selecting at least one object.

The input unit 110 may be implemented with at least one of a touch screen or a touch pad operating by a user's touch input, a key pad or a keyboard including various function keys, numeric keys, special keys, and character keys, a remote controller, a mouse, a motion recognition sensor recognizing a user's motion, and a voice recognition sensor recognizing the user's voice.

The input unit 110 may be variously implemented according to the type and feature of the electronic device 100. For example, when the electronic device 100 is implemented with a smartphone, the input unit 110 may be implemented with a touch screen or a voice recognition sensor. When the electronic device 100 is implemented with a TV, the input unit 110 may be implemented with a remote controller, a motion recognition sensor, or a voice recognition sensor. Additionally, when the electronic device 100 is implemented with a notebook PC, the input unit 110 may be implemented with a keypad or a touch pad.

Once an object theme is selected according to a user instruction, the information collection unit 120 may collect information corresponding to the object theme. For example, the information collection unit 120 may collect information according to the type of an object theme.

The information collection unit 120 may collect information from a web server. For example, the information collection unit 120 may collect information, such as a weather forecast, a temperature, a humidity, a UV intensity, a sunrise time, and a sunset time, a weather-related icon, and the like, from a web server providing weather service. Additionally, the information collection unit 120 may collect information, such as a friends list, profile pictures of friends, a number of times that content is shared, and comments of friends, from a web server providing Social Network Service (SNS). For this, the information collection unit 120 may include a communication module connected to and communicated with various web servers.

Additionally, the information collection unit 120 may access various modules in the electronic device 100 and may then collect information. For example, the information collection unit 120 may collect a current date and time, the current location of an electronic device, and the name of an electronic device by accessing a system module or may collect a current temperature, a humidity, and a pressure from a sensor module. Alternatively, the information collection unit 120 may collect information, such as the exposure time, flash on/off, ISO sensitivity, focus, and white balance of a camera by accessing a camera module. Additionally, the information collection unit 120 may collect information, such as the number of steps of a user, a user name, a user weight, an exercised amount of a user, a total exercise time, an exercised distance, food intake calories, a food intake time, and various icons by accessing an application module (for example, a health management application). Additionally, the information collection unit 120 may collect the tag name, capturing location, capturing date and time, and tag information of a picture by accessing a picture management module.

Thereafter, the information collection unit 120 may collect information inputted from a user through the input unit 110. For example, when a user inputs information, such as a birthday, a weight and a name through the input unit 110, the information collection unit 120 may collect the inputted information.

Moreover, the information collection unit 120 may generate new information by using the collected information. For example, when collecting the birthday of a user, the information collection unit 120 may generate a current age or age information at a past specific point by using the user's birthday. As another example, the information collection unit 120 may generate remaining time information until sunrise by using sunrise time information and current time information.

Further, when the preselected object theme is reselected, the information collection unit 120 may collect new information corresponding to the object theme. In addition, the information collection unit 120 may newly collect variable information corresponding to an object theme.

The storage unit 130 stores information collected by the information collection unit 120. The storage unit 130 may classify the collected information as variable information or invariable information and may then store it. The variable information is information of which values are changed over time and the invariable information is information of which values are not changed over time. Even the same type of information may be classified as variable information or invariable information according to the type of an object theme.

Thereafter, if a preselected object theme is reselected and new information is collected, the storage unit 130 may link stored information and new information and then store it. For example, the storage unit 130 may manage an object theme separate from an object-added image.

The display unit 140 may add an object to an image and display it by using information stored in the storage unit 130. For example, the display unit 140 may display a stored image or an image captured in a camera capturing mode, and if an object theme is selected according to a user instruction, an object may be added to a displayed image.

Even when an object is added to an image, the electronic device 100 may manage the image and the added object separately. For example, a new image is not generated by synthesizing an object with a displayed image itself and an image and an object are linked to each other and managed. Thereafter, when the image and the object are displayed on a display screen, they may be displayed together. Accordingly, each time an object theme is selected, new information is added, so that an object theme reflecting a user's personality may be generated.

When an object theme is reselected and new variable information is collected and stored, the display unit 140 may add an object to an image by using stored information and new information. For example, the display unit 140 may add stored variable information and new variable information to an image and may then display it. Alternatively, the display unit 140 may add stored invariable information and new variable information to an image and may then display it.

Thereafter, when an object is added and displayed, the display unit 140 may change at least one of the type, size, and position of an object added to an image according to variable information. For example, the display unit 140 may change at least one of the type, size, and position of an object added to an image according to the number of variable information or an information value.

The display unit 140 may add a new object according to a user instruction while an object is added to an image, or may change at least one of the position and size of the added object, or may delete the added object. Accordingly, a user may change an object theme according to the user's preference.

The control unit 150 controls the overall operations of the electronic device 100. The control unit 150 may add an object to an image and display it by separately controlling the input unit 110, the information collection unit 120, the storage unit 130, and the display unit 140 according to various embodiments of the present disclosure.

Hereinafter, various embodiments adding an object to an image are described with reference to FIGS. 2A to 12.

Figures 2A, 2B, 2C:
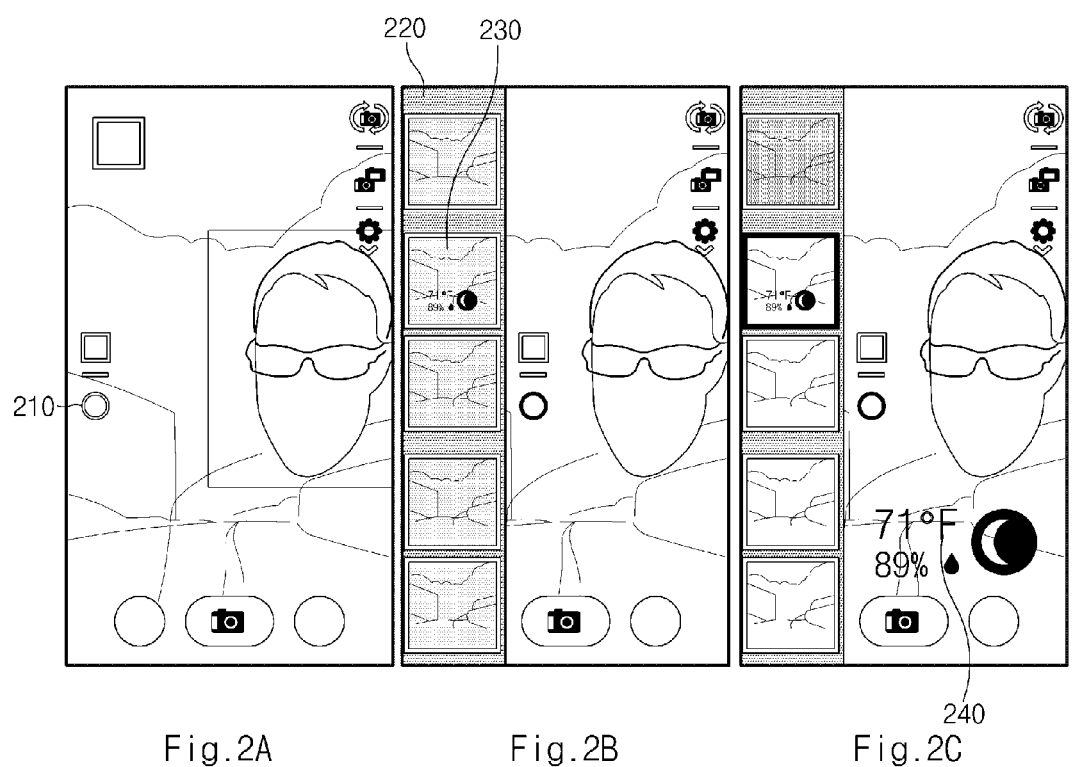
FIGS. 2A, 2B, and 2C are views illustrating a process for adding an object to an image according to an embodiment of the present disclosure.

FIGS. 2A, 2B, and 2C are views illustrating a process for adding an object to an image according to an embodiment of the present disclosure.

Referring to FIG. 2A, an image captured by a camera module may be disposed on a display screen. A user may select an object theme icon 210 for adding an object to a displayed image.

Once the object theme icon 210 is selected, as shown in FIG. 2B, a menu list 220 for selecting an object theme may be provided on a display screen. A user may select one object from object themes included in the menu list 220.

Once a user selects one object 230 of the object themes, as shown in FIG. 2C, at least one object 240 may be added to a displayed image and then displayed. For example, referring to FIG. 2C, an object representing the temperature and humidity and an icon object representing night may be added.

Moreover, once one object 230 of the object themes is selected, the information collection unit 120 may collect information corresponding to the selected object theme. For example, the information collection unit 120 may collect temperature and humidity information from a web server providing weather service or a sensor included in the electronic device 100. Additionally, the information collection unit 120 may collect an icon corresponding to the current time by accessing the current time information.

The storage unit 130 may classify temperature and humidity information, current time information, and icons as variable information and may then store the information. Thereafter, as shown in FIG. 2C, the display unit 140 may add an object to an image by using the stored information.

FIGS. 3A, 3B, 3C, 3D, and 3E are views illustrating a process for editing an object added to an image according to an embodiment of the present disclosure.

As shown in FIG. 2C, while an object is added to an image, once a user instruction for editing the object is inputted, as shown in FIG. 3A, a display screen may change into an edit mode. In the edit mode, as shown in FIG. 3A, a portion except an object may be dimmed. In the edit mode, according to a user instruction, some of the objects added to an image may be deleted. For example, once a user instruction for deleting an icon object 310 representing night as shown in FIG. 3A is inputted, the icon object 310 added to an image may be deleted as shown in FIG. 3B.

Moreover, in the edit mode, according to a user instruction, a new object may be added to an image. For example, once a menu 320 for adding a new object is selected as shown in FIG. 3B, a menu list 330 for selecting a new object may be provided as shown in FIG. 3C. A user may select one object from objects included in the menu list 330.

Once a user selects one object 340 of the objects, as shown in FIG. 3D, at least one object 350 may be added to a displayed image and then displayed. Referring to FIG. 3D, in addition to an existing object, a new icon object 350 may be displayed at a certain position. Here, once a new object is selected, the information collection unit 120 may collect information used for adding a new object and may store the collected information in the storage unit 130.

Moreover, in the edit mode, according to a user instruction, the position of an object added to an image may be changed. Once a user instruction for moving a new object 350 is inputted as shown in FIG. 3D, the position of the object 350 may be moved as shown in FIG. 3E.

Figure 4A:
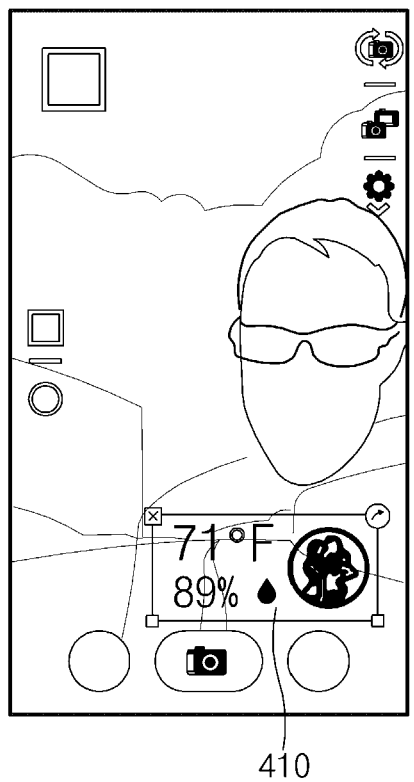
FIGS. 4A and 4B are views illustrating a process for editing an object added to an image according to an embodiment of the present disclosure.
Figure 4B:
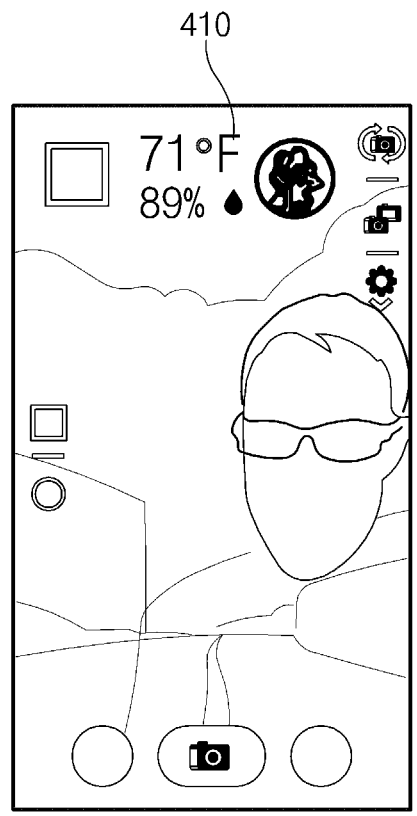

FIGS. 4A and 4B are views illustrating a process for editing an object added to an image according to an embodiment of the present disclosure.

Referring to FIG. 4A, a plurality of objects 410 edited by the editing process described with reference to FIGS. 3A, 3B, 3C, 3D, and 3E are added to an image and displayed. According to a user instruction, the positions of the plurality of objects 410 having the image added may be simultaneously changed. Once a user instruction for moving the plurality of objects 410 is inputted as shown in FIG. 4A, the positions of the plurality of objects 410 may be simultaneously changed as shown in FIG. 4B.

FIGS. 5A, 5B, 5C, 5D, 5E, 5F, 5G, and 5H are views illustrating a process for adding an object to an image according to an embodiment of the present disclosure.

Figure 5A:
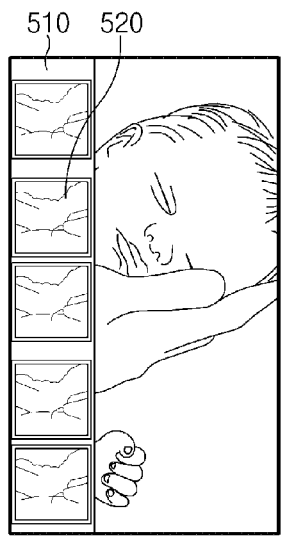
FIGS. 5A, 5B, 5C, 5D, 5E, 5F, 5G, and 5H are views illustrating a process for adding an object to an image according to an embodiment of the present disclosure.

Referring to FIG. 5A, according to a user instruction, a menu list 510 for selecting an object theme may be provided on a display screen. A user may select at least one object from object themes included in the menu list 510. For example, a user may select an age object theme 520.

Figure 5B:
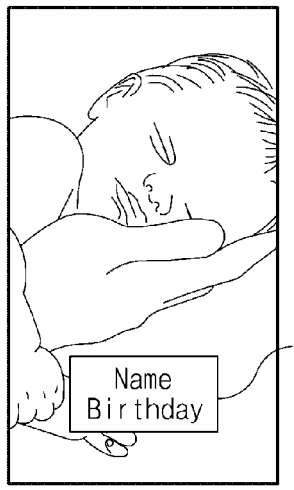
Figure 5C:
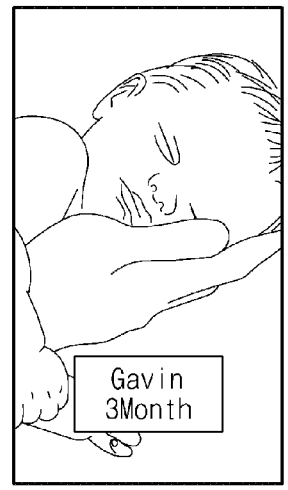

Once a user selects the age object theme 520, as shown in FIG. 5B, an object 530 for receiving the name and the birthday may be added to an image and then displayed. Once the user inputs the name and the birthday, as shown in FIG. 5C, an object representing the name and the age may be added.

Moreover, once the age object theme 520 is selected, the information collection unit 120 may collect current data information (when a camera module is used) or image-captured date information (when a stored image is used). Thereafter, once the name and the birthday are inputted from a user, the information collection unit 120 may collect the name and birthday information and may generate age information by using the current date information or the image-captured date information and the birthday information.

The storage unit 130 may store the name and birthday information as invariable information and may store the date information and the age information as variable information. Thereafter, the display unit 140 may add an object representing the name and age to an image by using the stored information as shown in FIG. 5C.

Figure 5D:
Figure 5E:

A user may select the age object theme again with respect to a different image. Referring to FIG. 5D, a menu list 510 for selecting an object theme may be displayed on a display screen. Once a user selects the age object theme 520 again, as shown in FIG. 5E, an age updated object 540, that is, variable information, may be added.

When the age object theme 520 is selected again, the information collection unit 120 may collect current data information (when a camera module is used), that is, variable information, or image-captured weather information (when a stored image is used). Unlike the case in which an object theme is selected first, the name and birthday, that is, invariable information, are not changed and thus the name and birthday information is not collected. Once the current date information or image-captured date information is newly collected, the information collection unit 120 may generate new age information by using stored birthday information.

The storage unit 130 may link the newly collected date information with the stored date information and may then store the newly collected date information. Thereafter, the display unit 140 may add an object representing the name and age to an image by using the stored name information and the newly collected age information as shown in FIG. 5E.

Figure 5F:
Figure 5G:

Moreover, a user may later add a new object to an image having an object added. When an image having an object added is called, as shown in FIG. 5F, an object is added to an image and then displayed. Once a menu for adding a new object is selected by a user, as shown in FIG. 5G, a menu list 550 for selecting a new object may be provided. A user may select one object from objects included in the menu list 330.

Figure 5H:

Once a user selects one object 560 of the objects, as shown in FIG. 5H, a new object is added to a displayed image and then displayed. Referring to FIG. 5H, in addition to the existing object, an object representing the current age and an image object 570 including the latest image among images having an object theme added may be added. For example, the image object 570 may include a face area image detected from the latest image.

FIGS. 6A, 6B, 6C, 6D, and 6E are views illustrating a process for adding an object to an image according to an embodiment of the present disclosure.

Figure 6A:
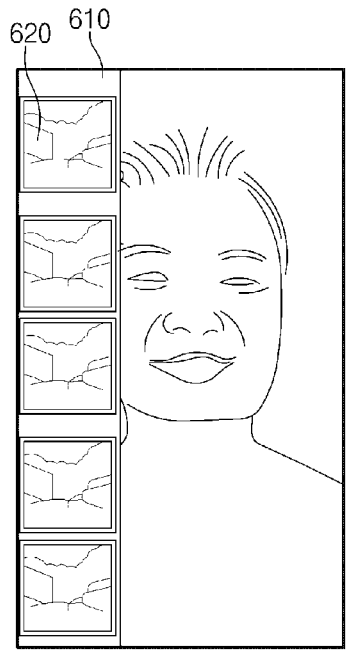

Referring to FIG. 6A, according to a user instruction, a menu list 610 for selecting an object theme may be provided on a display screen. A user may select at least one object from object themes included in the menu list 610. For example, a user may select a weight object theme 620.

Once a user selects the weight object theme 620, an object for receiving a weight is added to an image and then displayed. Once the user inputs the weight, as shown in FIG. 5B, an object representing the weight may be added.

Figure 6B:
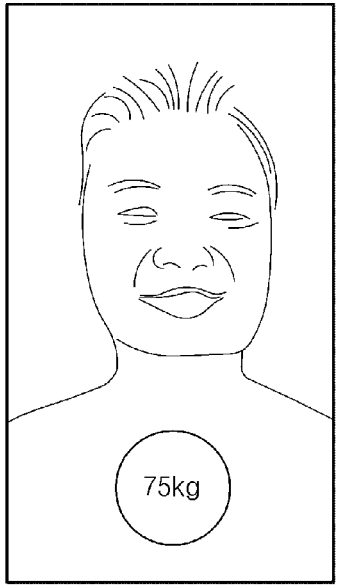

Moreover, once the weight object theme 620 is selected and the weight is inputted from the user, the information collection unit 120 may collect weight information and the collected weight information may be stored as variable information in the storage unit 130. Thereafter, as shown in FIG. 6B, the display unit 140 may add an object representing the weight by using stored information.

Figure 6C:
Figure 6D:
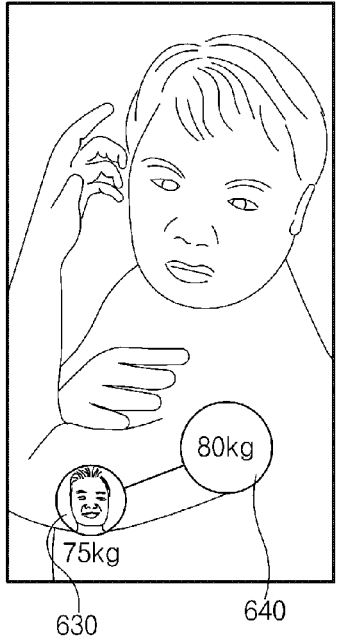

A user may select the weight object theme again with respect to a different image. Referring to FIG. 6C, a menu list 610 for selecting an object theme may be displayed on a display screen. When the user selects the weight object theme 620 again, an object for receiving a weight may be displayed and when the user inputs the weight, as shown in FIG. 6D, an existing weight object 630 and a weight object 640 based on the newly inputted weight may be displayed together.

The position of the weight object may be determined according to the weight inputted by the user. For example, when an initially inputted weight is 75 kg and a newly inputted weight is 80 kg, as shown in FIG. 6D, the new object 640 may be displayed above the existing object 630. Additionally, a newly added object may be displayed larger than an existing object. Here, the existing object 630 may include a face area image detected from the image having the existing object 630 added.

Figure 6E:
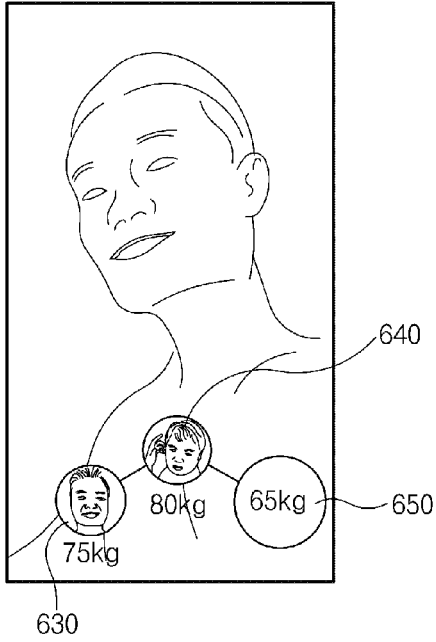

Moreover, once a user selects the weight object theme again with respect to a different image, as shown in FIG. 6E, in addition to the existing weight objects 630 and 640, a new weight object 650 may be added.

FIGS. 7A, 7B, 7C, 7D, 7E, and 7F are views illustrating a process for adding an object to an image according to an embodiment of the present disclosure.

Figure 7A:
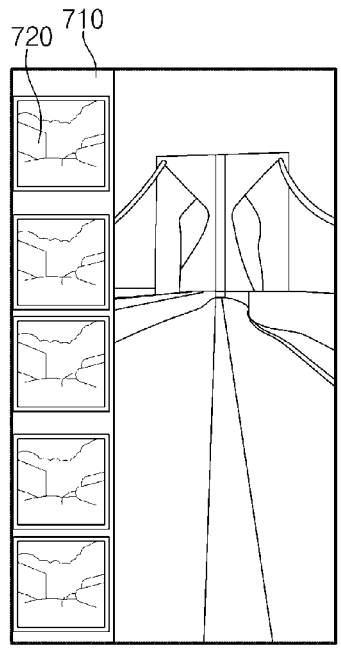

Referring to FIG. 7A, according to a user instruction, a menu list 710 for selecting an object theme may be provided on a display screen. A user may select at least one object from object themes included in the menu list 710. For example, a user may select a health object theme 720.

Figure 7B:
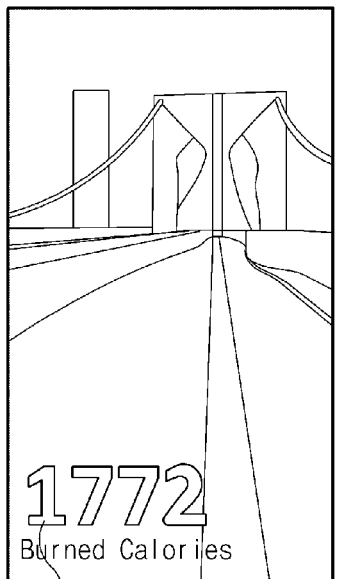

Once a user selects the health object theme 720, as shown in FIG. 7B, an object 730 representing burned calories may be added.

Moreover, once the health object theme 720 is selected, the information collection unit 120 may collect a user's burned calories according to the user's exercise by accessing a health management application module. Additionally, the information collection unit 120 may collect information on the user's target calories. The storage unit 130 may then store the burned calories as variable information and may store the target burned calories as invariable information. Thereafter, as shown in FIG. 7B, the display unit 140 may add an object representing burned calories to an image by using stored information.

Figure 7C:
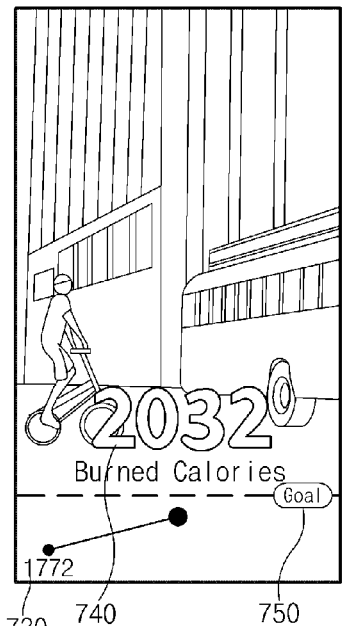

A user may select the health object theme again with respect to a different image. Once a user selects the health object theme again with respect to a different image, as shown in FIG. 7C, in addition to the existing object 730 representing burned calories and an object 740 representing target burned calories may be displayed together. Here, referring to FIG. 7C, the existing object 730 and the new object 740 may be expressed in a graph form.

The position of an object representing burned calories may be determined according to burned calories. For example, when burned calories collected from a previous image are 1772 cal and newly collected burned calories are 2032 cal, as shown in FIG. 7C, the new object 740 may be displayed above the existing object 730. Moreover, when target burned calories are collected, an object 750 representing the target burned calories may be added. If the target burned calories are set to 3000 cal, since the objects representing burned calories have values less than the target burned calories, they may be displayed below the target burned calories.

Figure 7D:
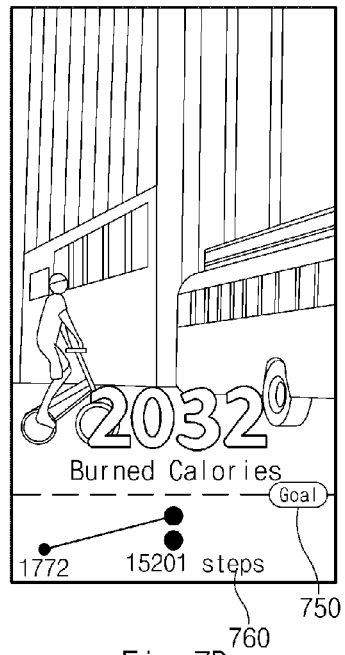

Additionally, a new object may be added and displayed according to a user's instruction. Referring to FIG. 7D, in addition to an existing object representing burned calories, an object 760 representing the number of steps of a user may be added and displayed.

Once a user instruction adding an object representing the number of steps of a user is inputted, the information collection unit 120 may collect information on the number of steps of a user by accessing a health management application module. The storage unit 130 may store the information on the number of steps as variable information and may store the target burned calories as invariable information. Thereafter, as shown in FIG. 7D, the display unit 140 may add an object representing the number of steps to an image by using stored information.

Figure 7E:
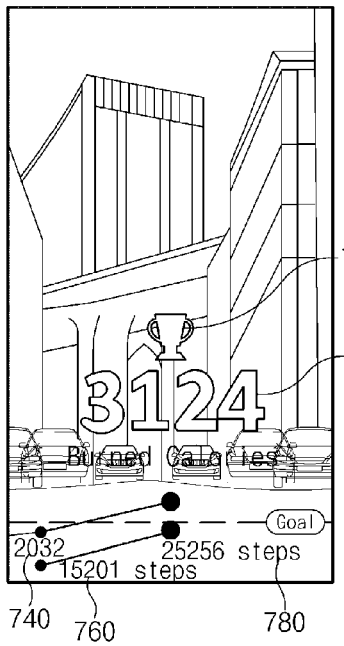

Once a user selects the health object theme again with respect to a different image, as shown in FIG. 7E, in addition to the existing objects 740 and 760 and objects 770 and 780 based on newly collected information may be displayed together. Moreover, when the newly collected burned calories information, for example, 3124 cal, exceeds the target burned calories, a new object 790 representing that the target burned calories are achieved may be added.

Figure 7F:
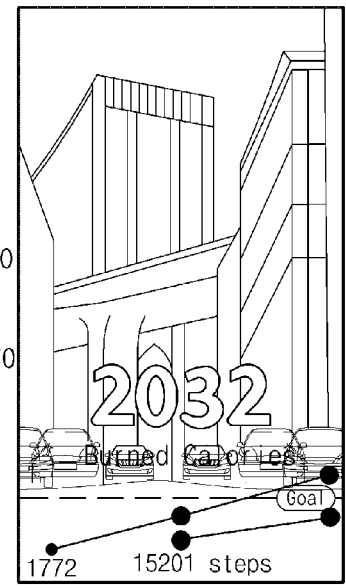

Moreover, as shown in FIG. 7E, if a previous object is not displayed as a new object is added, the previous object may be detected according to a user instruction. For example, as shown in FIG. 7F, the position of an object is moved and previous burned calories or the number of previous steps may be displayed.

FIGS. 8A, 8B, and 8C are views illustrating a process for adding an object to an image according to an embodiment of the present disclosure.

Referring to FIG. 8A, according to a user instruction, once a sunrise object theme is selected, a sun-shaped icon object 810 and an object 820 representing a sunrise time may be added.

Once the sunrise object theme is selected, the information collection unit 120 may collect sunrise time information, current time information, and sun-shaped icon information. Additionally, the information collection unit 120 may generate remaining time information until sunrise by using the sunrise time information and the current time information. The storage unit 130 may store the sunrise time information as invariable information and may store the current time information, the remaining time information before sunrise, and icon information as variable information. Thereafter, the display unit 140 may add the sun-shaped icon object 810 and the object 820 representing the sunrise time may be added by the stored information as shown in FIG. 8A.

Here, the color, shape, and position of a sun-shaped icon object may be determined according to the remaining time information before sunrise. For example, as shown in FIG. 8A, an icon 810 including an upper part of a sun shape may be added to an image captured at 4:50 a.m. Thereafter, an icon 830 including an area that is greater than that in FIG. 8B may be added to an image captured at 5:05 a.m. Additionally, as a sunset time approaches, the color of the icon object may change into red color.

Moreover, when a capturing time of an image is p.m., as shown in FIG. 8C, an icon object 840 and a sunset object 850 may be added to an image. Thereafter, the color, shape, and position of the icon object 840 may be determined according to the remaining time information before sunset.

Figure 9:
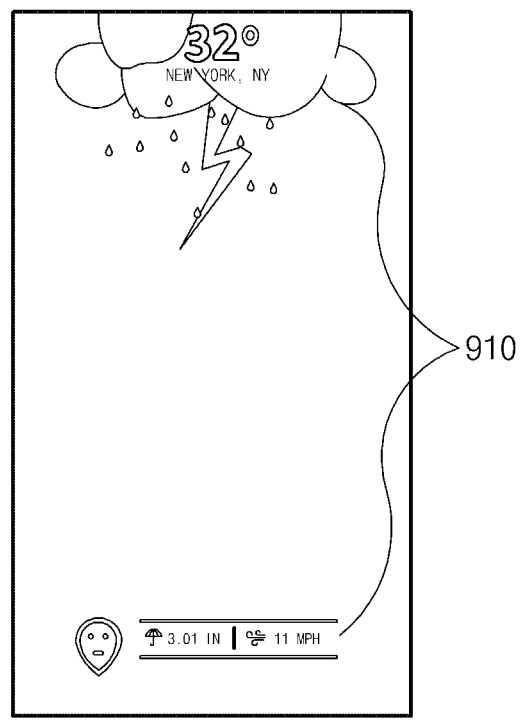

FIG. 9 is a view illustrating a process for adding an object to an image according to an embodiment of the present disclosure.

Referring to FIG. 9, once a weather object theme is selected according to a user instruction, various weather related objects may be added to an image. Once the weather object theme is selected, the information collection unit 120 may collect temperature, weather, wind, current location, and weather icon information. The storage unit 130 may store collected information as variable information. Thereafter, the display unit 140 may add an object 910 representing the temperature, the weather, the wind, the current location, and the weather icon may be added as shown in FIG. 9.

Here, the weather icon object 910 may vary according to current weather information. For example, as shown in FIG. 9, if the weather information is 'rain', a cloud-shaped icon and a lightning-shaped icon may be added to an image. Thereafter, when the weather information is 'sunny', a sun-shaped icon may be added.

Figure 10:

FIG. 10 is a view illustrating a process for adding an object to an image according to an embodiment of the present disclosure.

Referring to FIG. 10, once the weather object theme is selected according to a user instruction, various weather related objects may be added to an image. Once the weather object theme is selected, the information collection unit 120 may collect temperature, weather, humidity, wind, current position, current date, and time information. The storage unit 130 may store collected information as variable information. Thereafter, the display unit 140 may add an object representing the temperature, the weather, the humidity, the wind, the current position, the date, and the time may be added by using the stored information as shown in FIG. 9.

Here, the type, position, and size of an added object may vary according to current weather information. For example, when the weather information is 'sunny', an object representing a weather, a wind, and a humidity may not be added or displayed small. Additionally, as an object representing a weather, a wind, and a humidity changes, the position and size of the remaining object may be changed.

Figure 11:
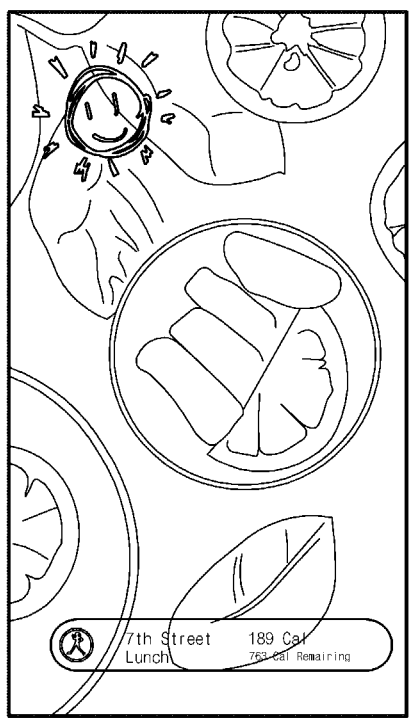

FIG. 11 is a view illustrating a process for adding an object to an image according to an embodiment of the present disclosure.

Referring to FIG. 11, according to a user instruction, once the food object theme is selected, an object representing a meal time (for example, lunch), food calories, and the remaining calories (based on the recommended daily calories) may be added to an image. Once the food object theme is selected, the information collection unit 120 may collect a current position and a current time and also may collect food type information inputted from a user. The information collection unit 120 may generate meal time information by using the current time and may calorie information by using the food type information inputted from a user. Additionally, the information collection unit 120 may generate the remaining calorie information by using recommended daily calorie information and food calorie information. The storage unit 130 may store the recommended daily calorie information as invariable information and may store the remaining information as variable information. The display unit 140 may add an object representing a meal time, food calories, and the remaining calories (based on the recommended daily calories) by using the stored information as shown in FIG. 11.

Thereafter, according to a user instruction, once the food object theme is selected again, an object representing a meal time, food calories, and the remaining calories (based on the recommended daily calories) may be added according to the above process. The remaining calorie information may be generated based on the stored food calories and currently collected food calorie information and then displayed as an object.

Figure 12:
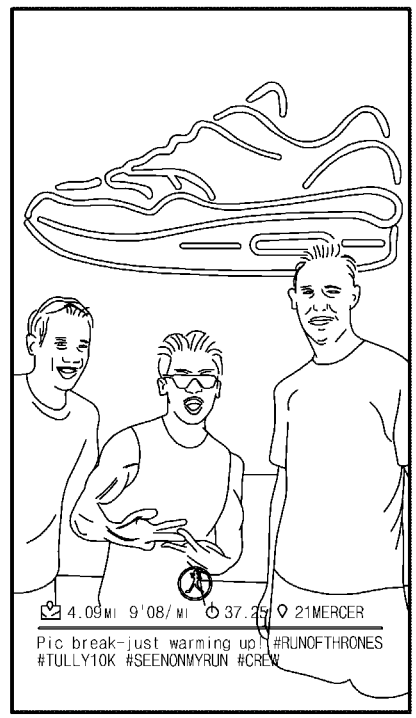

FIG. 12 is a view illustrating a process for adding an object to an image according to an embodiment of the present disclosure.

Referring to FIG. 12, once an exercise object theme is selected according to a user instruction, an object representing an exercise distance, an exercise time, an exercise time/distance, and a current position may be added to an image. Once the exercise object theme is selected, the information collection unit 120 may collect exercise start time, exercise start location, current time, exercise distance, exercise time, exercise time/distance, current position, and target exercise amount information. The storage unit 130 may store the exercise start time and exercise start location information as invariable information and may store the current time, exercise distance, exercise time, exercise time/distance, current position information as variable information. Thereafter, the display unit 140 may add an object representing the exercise distance, the exercise time, the exercise time/distance, and the current location by using the stored information as shown in FIG. 11. Here, when a current exercise amount exceeds the target exercise amount, an additional icon or message object may be added.

Moreover, when a face is included in an image, the electronic device 100 may recognize a specific face by detecting a face area through a face detection algorithm or may receive the name information from a user. Accordingly, the electronic device 100 may add an object including information on people included in the image.

Moreover, when an object theme is applied to an image according the process described with reference to FIGS. 2A to 12, the storage unit 130 may link the image with the object theme and may then store it. Accordingly, a user may select and appreciate an image having the same object theme added thereto or may search for an image that satisfies a specific condition.

Once a slide show instruction for an image having the same object theme applied thereto is inputted, the display unit 140 may align images based on one of the variable information and may then display them sequentially. At this point, an object added to each image may be displayed together. In addition, the position of an object added to an image may be changed and displayed in order to correspond to the order of a currently displayed image among the aligned images. Additionally, if the variable information includes position information, a map and the capturing location of an image may be displayed together and according to the capturing location of a displayed image, an object representing the capturing location may be sequentially moved.

Hereinafter, a display process of an image having an object added thereto is described with reference to FIGS. 13 to 15.

FIGS. 13A, 13B, 13C, and 13D are views illustrating a process for displaying an image having an object added thereto according to an embodiment of the present disclosure.

Referring to FIG. 13A, a plurality of images having an object theme applied thereto are displayed. Here, once a user inputs a user instruction to select an image having a specific object theme applied thereto, as shown in FIG. 13B, a menu list 1310 for selecting an object theme may be provided on a display screen. Once a user selects an object theme ○A 1320, as shown in FIG. 13C, an image having the object theme ○A 1320 applied thereto may be selected from a plurality of images one 1320 of the objects and then displayed.

Here, the image having the object theme ○A○A○A○A 1320 applied thereto may be aligned based on one of variable information according to a user instruction. For example, in the case of an image having an age object theme applied thereto, the image may be aligned based on age information or the capturing time of the image. As another example, in the case of an image having a weight object theme applied thereto, the image may be aligned based on a weight or the capturing time of the image. The aligned image may be generated as one video file.

As shown in FIG. 13D, the aligned image may be sequentially displayed over time. Each image may be displayed at the same time interval. Thereafter, the display time for an image 1330 where an event occurs may be set longer. For example, in the case of an age object theme, the display time for an image having an event, such as a hundred days after a baby is born, a first-birthday, and a birthday may be set longer. As another example, in the case of a weight object theme, the display time for an image having an event, such as +10 kg or +5 kg from a target weight and a target weight reached may be set longer.

Figures 14A, 14B, 14C:
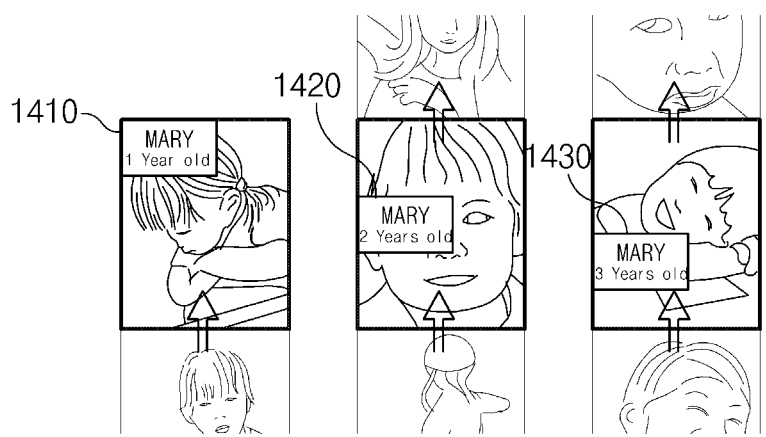
FIGS. 14A, 14B, and 14C are views illustrating a process for displaying an image having an object added thereto according to an embodiment of the present disclosure.

FIGS. 14A, 14B, and 14C are views illustrating a process for displaying an image having an object added thereto according to an embodiment of the present disclosure.

An image aligned based on one of variable information is aligned in one direction of a display screen as shown in FIG. 14A, so that it may be displayed sequentially according to a scroll instruction of a user. As shown in FIG. 14A, an object 1410 added to an image may be displayed together. Thereafter, referring to FIGS. 14B and 14C, the positions of objects 1410, 1420, and 1430 added to respective images may be changed to correspond to the order of a currently displayed image among the aligned images and then displayed. Accordingly, a user may intuitively the order of a currently displayed image by using the position of an object added to an image.

Figures 15A, 15B, 15C:
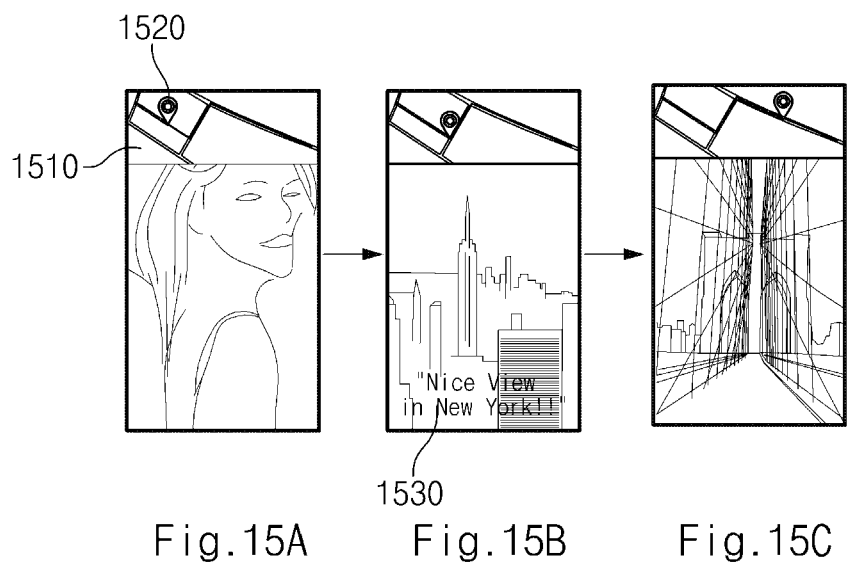
FIGS. 15A, 15B, and 15C are views illustrating a process for displaying an image having an object added thereto according to an embodiment of the present disclosure.

FIGS. 15A, 15B, and 15C are views illustrating a process for displaying an image having an object added thereto according to an embodiment of the present disclosure.

When aligned images are sequentially displayed, in the case that variable information includes position information, as shown in FIG. 15A, a map 1510 and an object 1520 representing the capturing location of an image may be displayed together. Thereafter, referring to FIGS. 15B and 15C, an object representing a capturing location may be sequentially moved according to the capturing location of a displayed image. Thereafter, referring to FIG. 15B, an additional object 1530 may be displayed with respect to an image where an event occurs during a display process.

Figure 16:
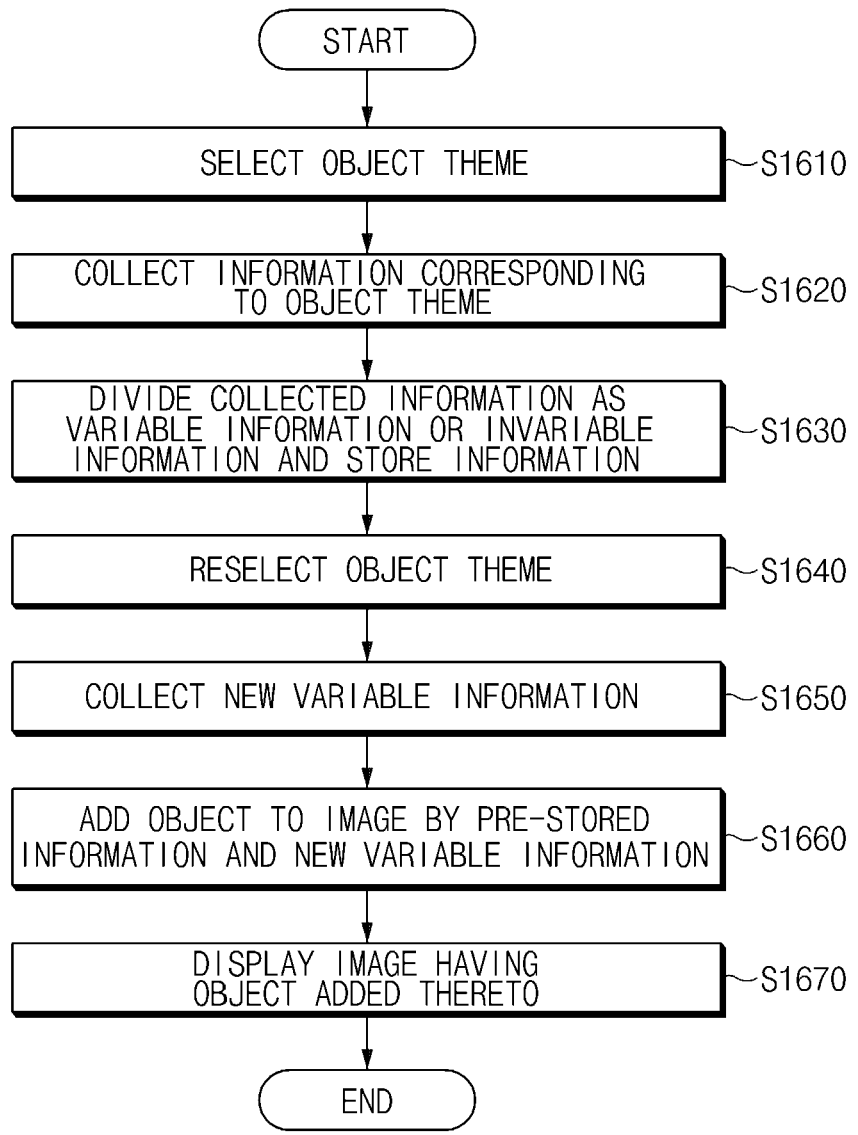
FIG. 16 is a flowchart illustrating a display method according to an embodiment of the present disclosure.

FIG. 16 is a flowchart illustrating a display method according to an embodiment of the present disclosure.

Referring to FIG. 16, the electronic device 100 receives a selection on an object theme from a user in operation S1610. The object theme may include at least one object. The electronic device 100 may provide an object theme including a certain object. Thereafter, a user may generate a new object theme by editing a provided object theme. In addition, a user may generate a new object theme by selecting at least one object. For example, the electronic device 100 may receive a selection on at least one object from a user, generate an object theme including the selected object, and store it.

Once an object theme is selected, information corresponding to the object theme is collected in operation S1620. For example, information may be collected from a web server or the electronic device 100 or information inputted from a user may be collected. For example, information, such as a weather forecast, a temperature, a humidity, a UV intensity, a sunrise and sunset time, a weather-related icon, and the like, may be collected from a web server providing weather service. Additionally, information, such as a friends list, profile pictures of friends, the number of content sharing, and comments of friends may be collected from a web server providing SNS.

Additionally, information may be collected by accessing various modules in the electronic device 100. For example, the current date and time, the current location of an electronic device, and the name of an electronic device may be collected by accessing a system module or a current temperature, a humidity, and a pressure may be collected from a sensor module. Alternatively, information, such as the exposure time, flash on/off, ISO sensitivity, focus, and white balance of a camera may be collected by accessing a camera module. Additionally, information, such as the number of steps of a user, a user name, a user weight, an exercise amount of a user, a total exercise time, an exercise distance, a food intake calorie, a food intake time, and various icons may be collected by accessing an application module (for example, a health management application). Additionally, the tag name, capturing location, capturing date and time, and tag information of a picture may be collected by accessing a picture management module.

Additionally, information inputted from a user may be collected. For example, once a birthday, a weight and a name are inputted, the inputted information may be collected.

Thereafter, new information may be generated by using the collected information. For example, when the birthday of a user is collected, a current age or age information at a past specific point may be generated by using the user's birthday. As another example, the remaining time information until sunrise may be generated by using sunrise time information and current time information.

Once the information is collected, the electronic device 100 may classify the collected information as variable information or invariable information and may then store it in operation S1630. The variable information is information of which value is changed over time and the invariable information is information of which value is not changed over time. Even the same type of information may be classified as variable information or invariable information according to the type of an object theme.

Thereafter, when the object theme is re-selected by a user in operation S1640, new variable information is collected in operation S1650. The variable information may be lined with stored information and then stored.

In addition, an object is added to an image by using the stored information and the new variable information in operation S1660. An object may be added to a stored image or an image captured in a camera capturing mode. When an object is added to an image, stored variable information and new variable information may be added together. Alternatively, stored invariable information and new variable information may be added to an image.

Here, the type, size, position of an object added to an image may vary according to variable information. For example, at least one of the type, size, and position of an object may be changed according to the number of variable information or an information value.

Thereafter, an image having an object added thereto is displayed in operation S1670.

While an object is added to an image, according to a user instruction, the object may be edited or deleted or a new object may be added. Once a user instruction for adding a new object to an image having an object added thereto is inputted, information corresponding to a new object may be collected. Thereafter, a new object may be added by using the collected information and then displayed. Furthermore, while an object is added to an image, once a user instruction for editing or deleting the object is inputted, at least one of the position and size of the object added to the image may be changed or deleted and then displayed. Since the addition, deletion, and editing of an object are described with reference to FIGS. 2A to 4B, their descriptions are omitted.

Moreover, once an object theme is applied to an image, the image and the object theme added thereto may be linked and then stored. A user may select and appreciate an image having the same object theme added thereto or may search for an image that satisfies a specific condition.

Once a slide show instruction for an image having the same object theme applied thereto is inputted, images may be aligned based on one of the variable information and then displayed sequentially. At this point, an object added to each image may be displayed together. In addition, the position of an object added to an image may be changed and displayed in order to correspond to the order of a currently displayed image among the aligned images. Additionally, if the variable information includes position information, a map and the capturing location of an image may be displayed together and according to the capturing location of a displayed image, an object representing the capturing position may be sequentially moved. This is described with reference to FIGS. 13A to 15C and thus, its descriptions are omitted.

According to the above-mentioned various embodiments of the present disclosure, when related information is added to an image, an object that reflects a user's personality may be provided. In addition, various forms of objects may be provided according to a user environment by dynamically managing information accumulated over time. Thereafter, an image having an object added thereto may be managed and also may be generated as a new form of content.

Moreover, a display method according to various embodiments of the present disclosure may be implemented by a program executable in an electronic device. Such a program may be stored in various types of recording media and then used.

For example, a program code for performing the above methods may be stored in various types of nonvolatile memory recording media, such as a flash memory, a Read Only Memory (ROM), an Erasable Programmable ROM (EPROM), an Electronically Erasable and Programmable ROM (EEPROM), a hard disk, a removable disk, a memory card, a Universal Serial Bus (USB) memory, and a CD-ROM.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
 a display;
 a memory;
 an input interface configured to receive a selection on an object theme including at least one object from a user; and
 a controller configured to:
  collect information corresponding to the object theme,
  classify the collected information into variable information, of which values are changed over time, or invariable information, of which values are not changed over time,
  store the classified information in the memory,
  add, when new variable information is collected according to a user instruction for reselecting the object theme, an object to an image by using the stored information and the new variable information, and
  display the image on the display,
 wherein the controller is further configured to generate at least a portion of the new variable information by using the collected information.

2. The electronic device of claim 1, wherein the controller is further configured to add an object based on the stored variable information and the new variable information to the image.

3. The electronic device of claim 1, wherein the controller is further configured to change at least one of a type, size, or position of the object added to the image according to the variable information.

4. The electronic device of claim 1, wherein, when new variable information is collected according to a user instruction for reselecting the object theme, the controller is further configured to link stored information and the new variable information and to store the linked information.

5. The electronic device of claim 1, wherein the controller is further configured to collect information through a web server or a terminal device or collect information inputted from a user.

6. The electronic device of claim 1, wherein the controller is further configured to add a new object to the image having the object added thereto according to a user instruction.

7. The electronic device of claim 1, wherein the controller is further configured to change at least one of a position or size of the object added to the image according to a user instruction.

8. The electronic device of claim 1, wherein the controller is further configured to delete the object added to the image according to a user instruction.

9. The electronic device of claim 1, wherein, when a slide show instruction for an image having the same object theme applied thereto is inputted, the controller is further configured to align images based on one of the variable information, and to sequentially display the aligned images.

10. The electronic device of claim 9, wherein the controller is further configured to change a position of the object added to the image to correspond to an order of a currently displayed image among the aligned images and to display the image.

11. A display method comprising:
receiving a selection on an object theme including at least one object from a user;
collecting information corresponding to the object theme;
classifying the collected information into variable information, of which values are changed over time, or invariable information, of which values are not changed over time, and storing the classified information;
when the object theme is reselected by a user, collecting new variable information;
adding an object to an image by using the stored information and the new variable information; and
displaying the image having the object added thereto,
wherein the collecting of the new variable information comprises generating at least a portion of the new variable information by using the collected information.

12. The method of claim 11, wherein the adding of the object to the image comprises adding an object based on the stored variable information and the new variable information to the image.

13. The method of claim 11, wherein the collecting of the information further comprises:
collecting information through a web server or a terminal device or collecting information inputted from a user.

14. The method of claim 11, further comprising:
receiving a user instruction for adding a new object to the image having the object added thereto;
collecting information corresponding to the new object; and
adding the new object to the image by using the collected information and displaying the image.

15. The method of claim 11, further comprising:
receiving a user instruction for editing the object added to the image; and
changing at least one of a position or size of the object added to the image according to the user instruction and displaying the image.

16. The method of claim 11, further comprising:
receiving a user instruction for deleting the object added to the image; and
deleting the object added to the image according to the user instruction and displaying the image.

17. The method of claim 11, further comprising:
receiving a selection on at least one object from a user;
generating an object theme including the selected object; and
storing the object theme.

18. The method of claim 11, further comprising:
receiving a slide show instruction for an image having the same object theme applied thereto;
aligning images image having the same object theme applied thereto based on one of the variable information; and
sequentially displaying the aligned images.

19. The method of claim 18, wherein the sequentially displaying of the aligned images comprises changing a position of the object added to the image to correspond to an order of a currently displayed image among the aligned images and displaying the image.

20. A non-transitory computer readable recording medium having a program recorded thereon and implementing claim 11.

* * * * *